United States Patent [19]  [11] 3,892,749
Kalopissis et al.  [45] July 1, 1975

[54] INDAMINE SALTS

[75] Inventors: Gregoire Kalopissis, Paris; Andrée Bugaut, Boulogne-sur-Seine; Françoise Estradier, Paris, all of France

[73] Assignee: L'Oreal, Paris, France

[22] Filed: Apr. 3, 1974

[21] Appl. No.: 457,620

Related U.S. Application Data

[62] Division of Ser. No. 180,456, Sept. 14, 1971, Pat. No. 3,824,075.

[30] Foreign Application Priority Data

Sept. 18, 1970 France .............................. 70.34043

[52] U.S. Cl. ... 260/270 H; 260/293.76; 260/293.79; 260/396 N
[51] Int. Cl. .......................................... C07c 119/06
[58] Field of Search ....... 260/396 N, 270 H, 293.79, 260/293.76

[56] References Cited
UNITED STATES PATENTS 248,246 10/1881 Witt ................................ 260/396 N

*Primary Examiner*—Lorraine A. Weinberger
*Assistant Examiner*—E. Jane Skelly
*Attorney, Agent, or Firm*—Cushman, Darby & Cushman

[57] ABSTRACT

Indamine salts, having the formula

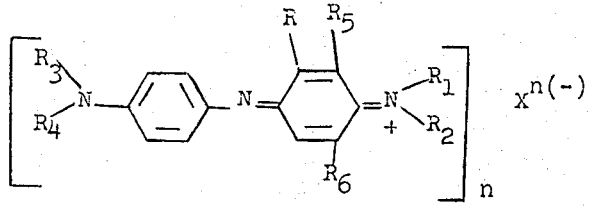

wherein $R_1$ and $R_2$ are lower alkyl, $R_3$ and $R_4$ are lower alkyl which can be substituted with hydroxy, amino or acylamino, $R_5$ and $R_6$ are hydrogen, lower alkyl or lower alkoxy, R is amino, acylamino or hydroxy, $n$ is 1–2 and $X^{n(-)}$ is an anion, are useful for dyeing keratinous fibers and, in particular, human hair. These salts can be in a tautomeric form of that represented above.

2 Claims, No Drawings

INDAMINE SALTS

This is a division of application Ser. No. 180,456 filed Sept. 14, 1971 now U.S. Pat. No. 3,824,075.

The present invention relates to novel indamine salts of the general formula:

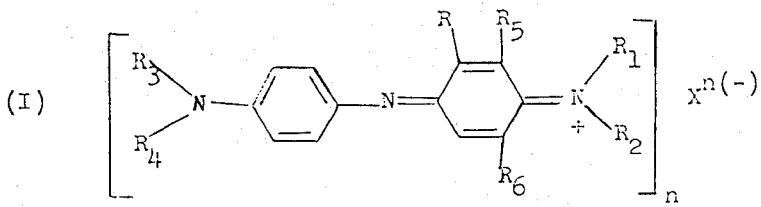

wherein $R_1$ and $R_2$ each independently represent lower alkyl containing 1 to 4 carbon atoms; $R_3$ and $R_4$ each independently represent lower alkyl containing 1–4 carbon atoms and lower alkyl containing 1–4 carbon atoms and substituted with a member selected from the group consisting of hydroxy, amino and acylamino wherein the acyl moiety has 1 to 4 carbon atoms; $R_5$ and $R_6$ each independently represent hydrogen and lower alkyl containing 1–4 carbon atoms and lower alkoxy containing 1–4 carbon atoms; R is selected from the group consisting of amino, acylamino wherein the acyl moiety has 1 to 4 carbon atoms and hydroxy; n is a whole number equal to 1 or 2; $X^{n(-)}$ is an anion selected from the group consisting of persulfate, perchlorate, chloride, bromide and $Cl_3Zn^-$, it being understood that these compounds can be in a form tautomeric of that shown by formula (I).

The indamine salts of formula (I) can be prepared by condensing a paraphenylenediamine having the formula:

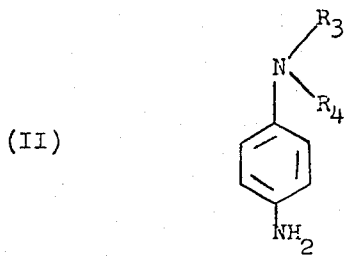

wherein $R_3$ and $R_4$ have the meaning given above, on a compound having the formula:

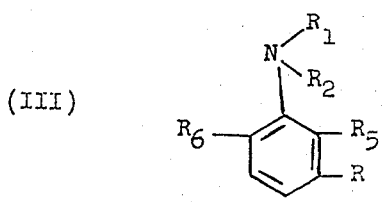

wherein $R_1$, $R_2$, $R_5$, $R_6$ and R also have the meaning above. The condensation reaction can be carried out in a reaction medium comprising a member selected from the group consisting of an aqueous, aqueous alcoholic or aqueous acetonic alkaline medium, in the presence of an oxidizing agent such as hydrogen peroxide or a water-soluble inorganic peroxy salt such as an alkaline persulfate. The initial reactants, represented by formulae (II) and (III) above can be used in the form of their salts. Subsequently there is added to the reaction medium a salt of an acid corresponding to the desired indamine salt which acid salt is more soluble in water than the desired indamine salt, thereby precipitating the latter from the reaction medium.

The added acid salt can be, for example, an alkaline persulfate such as sodium, potassium or ammonium persulfate, an alkaline perchlorate such as sodium, potassium, or ammonium perchlorate, an alkaline chloride or bromide such as sodium, potassium or ammonium chloride or bromide or again zinc chloride when a double salt is desired.

When an alkaline persulfate is used as the oxidizing agent, the resulting indamine persulfate, which is often less soluble in water, precipitates as soon as the condensation is performed. However, it has been found that it is often preferable, in order to obtain indamine persulfates in a greater state of purity, to process in two stages. In the first stage, the condensation reaction is effected in the presence of hydrogen peroxide. In the second stage, an alkaline persulfate including ammonium persulfate is added to the reaction mixture.

Representative paraphenylenediamines of formula (II) that can be used in the process according to the present invention include N,N-diethyl paraphenylenediamine N,N-dimethyl paraphenylenediamine, N,N-(ethyl,β-piperidinoethyl) paraphenylenediamine, N,N-(ethyl,β-acetaminoethyl) paraphenylenediamine and N,N-(di-β-hydroxyethyl) paraphenylenediamine.

Representative compounds of formula (III) that can be used in the process according to the present invention include metadiethylaminophenol, N,N-dimethyl metaphenylenediamine and meta N,N-(diethyl)amino acetanilide.

The condensation reaction is generally carried out at atmospheric pressure and at a temperature ranging from about – 10°C to 30°C. Generally, the paraphenylenediamine and the compound represented by formula III are employed in essentially equimolar amounts. When the reaction medium is an aqueous alkaline solution, an alkalinizing agent such as ammonia or the like is present in amounts such that the pH is about 8 to 11. When the reaction medium is an aqueous alcohol solution, the alcohol employed is generally a lower alkanol having 1–4 carbon atoms and is present in the aqueous solution in amounts of about 10 to 30 percent by weight thereof. When the reaction medium is an aqueous acetonic solution, acetone can comprise between about 10 to 30 weight percent thereof. The oxidizing agent is generally present in stoichiometric amounts when this oxidizing agent is a persalt, and in excess when it is hydrogen peroxide.

Further it is possible to prepare the indamine salts of formula (I) by condensing a compound of formula (III) on a nitroso derivative having the formula:

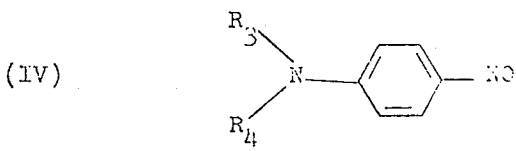

(IV)

wherein $R_3$ and $R_4$ have the meaning given above. In this embodiment of the present invention, the compound of formula III and the compound of formula IV are also used in essentially equimolar amounts and the condensation reaction can be effected in an aqueous medium or in an ethanol medium in the presence of zinc chloride.

When this condensation is performed in an aqueous medium, the nitroso derivative (IV) is preferably used in the form of its hydrochloride or hydrobromide at a temperature between 30° and 60°C, thereby isolating a corresponding indamine chloride or bromide after salting out, if necessary.

When the above condensation is effected in an ethanol medium, the nitroso derivative of formula (IV) is used in unsalified form, and the condensation is effected at reflux in the presence of zinc chloride, thereby producing the double chloride of zinc and the indamine of formula (I), the zinc chloride being present in essentially stoichiometric amounts to produce said indamine salt.

Representative nitroso derivatives of formula (IV) usefully employed in this embodiment of the present invention include p-nitroso N,N-diethylaniline, p-nitroso N,N-dimethylaniline, p-nitroso N,N-(ethyl,β-acetylaminoethyl) aniline, p-nitroso N,N-(di-β-hydroxyethyl) aniline and p-nitroso N,N-(ethyl, β-piperidinoethyl) aniline.

The indamine salts according to the present invention constitute dyes which have a great dyeing power in a broad pH range, which can vary from pH 3 to pH 10. Because of their great affinity for keratinous fibers, very slight concentrations of these dyes are sufficient to obtain intense shades, which explains why these salts which are relatively insoluble in water are perfectly usable.

Consequently, the present invention also provides novel dye composition for keratinous fibers, in particular human hair, characterized by the fact that it contains in solution at least one compound represented by formula (I).

The dye compositions according to the invention can contain only the compounds of formula (I), in which case they make it possible to obtain on white hair shades that go from blue to green, after an extremely short application period, of the order of three minutes at ambient temperature.

Because of the great dyeing power of the novel compounds of formula (I) their concentration in the compositions according to the invention can, as said above, be extremely slight, of the order of 0.002 percent by weight. However, this concentration can vary from 0.002 to 1 percent by weight.

The compositions according to the invention can also contain other direct dyes, for example, anthraquinone dyes, nitro dyes of the benzene series, indoanilines, indophenols or indamines other than those of formula (I).

The compositions according to the invention make it possible to obtain very luminous shades rich in glints, which often give the hair a pearly appearance.

The dye compositions according to the invention are generally in the form of aqueous or aqueous alcohol solutions which can be easily prepared by dissolving in water one or more compounds of formula (I) in mixture or not with other direct dyes. However, they can also contain thickeners and be in the form of creams or gels. When an alcohol solution is employed generally the alcohol will be a lower alkanol such as ethanol or isopropanol, the alkanol being present in the aqueous solution in amounts of about 20 to 70 percent by weight thereof.

The compositions according to the invention can further contain various ingredients, usually used in cosmetics, for example, wetting agents, dispersing agents, swelling agents, penetrating agents, softeners or perfumes. They can also be packaged under pressure in aerosol bombs or containers, together with a conventional aerosol propellant such as dichlorodifluoromethane, trichloromonofluoromethane and their mixtures. Obviously, other conventional aerosol propellants can also be used.

The pH of the dye compositions according to the invention can vary from 3 to 10. Preferably, however, the pH ranges between 4 and 9.

Dyeing of keratinous fibers, in particular human hair, with dye compositions according to the invention can be performed in the usual way by application of the composition to the fibers to be dyed, the composition being left in contact with the fibers for a time varying from 3 to 30 minutes. Following this application, the fibers are rinsed, and if desired, washed. Thereafter, the thus treated fibers are dried.

In another embodiment of the present invention, the novel indamine salts can be employed in the production of capillary hair-setting lotions. These lotions comprise an aqueous alcohol solution, at least a cosmetic film forming resin and at least one indamine salt of formula (I). The amount of indamine salt present in the hairsetting lotion of the present invention can be extremely low. Such an amount ranges generally between about 0.002 to 0.5 percent by weight of the total hairsetting lotion composition. Representative cosmetic resins that can be employed in the hair-setting lotion composition of the present invention include, for instance, polyvinylpyrrolidone having a molecular weight ranging from about 10,000–70,000, copolymer of crotonic acid and vinyl acetate, copolymer of vinylpyrrolidone and vinyl acetate wherein the ratio of PVP to VA ranges between 50–70: 50–30, copolymer of maleic anhydride and butylvinyl ether and the like. These resins are used in a proportion of about 1 to 3% by weight of the hair-setting lotion composition.

The alcohols suitable for the preparation of the hair-setting lotions of the invention are low molecular weight alkanols, preferably, ethanol or isopropanol, which are present in amounts of about 20 to 50 percent by weight of the total hair-setting lotion composition. The pH of the hair-setting lotion of the invention can range from 3–10, and preferably between about 6–8.

Hair-setting lotions of the present invention that contain only the dyes of formula (I) are shading compositions which make it possible to impart to the hair extremely luminous glints and often give it a pearly or iridescent appearance.

However, the hair-setting lotions of this invention can also contain other direct dyes, for example, anthraquinone dyes, nitro dyes of the benzene series, indoanilines, indophenols or again other indamines.

These hair-setting lotions are used in the customary way by applying the same to wet human hair which has been previously washed and rinsed, followed by rolling up and drying of the hair.

The following examples are intended to illustrate the various aspects of the present invention. Unless otherwise specified, all parts and percentages are by weight and all temperatures are expressed in degrees centigrade.

EXAMPLE 1

The double chloride of zinc and N-[4-(ethyl, β-piperidino ethyl)amino phenyl]3-hydroxy benzoquinoneimine N',N'-diethyliminium having the below formula is prepared as follows:

0.012 mole (3.1 g) of paranitroso N,N-(ethyl,β-piperidinoethyl) aniline and 0.012 mole (1.9 g) of metadiethylaminophenol are dissolved in 20 cc of absolute ethanol. 1.7 g of zinc chloride are added to this solution and the reaction mixture is heated for 30 minutes at reflux. After cooling 4.8 g of the above double salt of zinc and indamine precipitate and are filtered from the reaction medium, washed with ethanol and dried under a vacuum. The product is chromatographically pure.

EXAMPLE 2

The double chloride of zinc and N-[4-(ethyl, β-acetylaminoethyl)amino phenyl]3-acetylamino benzoquinoneimine N',N'-dimethyliminium having the below formula is prepared as follows:

To a solution of 0.01 mole (2.35 g) of paranitroso N,N-(ethyl, acetylaminoethyl) aniline in 10 cc of absolute ethanol there are added, on the one hand, 0.01 mole (1.78 g) of 3-dimethylamino acetanilide in 10 cc of absolute ethanol and, on the other hand, 2 g of zinc chloride. The resulting mixture is heated at reflux for 30 minutes. 2 g of the double zinc and indamine salt precipitate, are cooled and filtered from the reaction mixture. This double salt, after washing with ethanol, is chromatographically pure.

EXAMPLE 3

The double chloride of zinc and N-[(4-dimethylamino)phenyl]3-hydroxy benzoquinoneimine N',N'-diethyliminium having the below formula is prepared as follows:

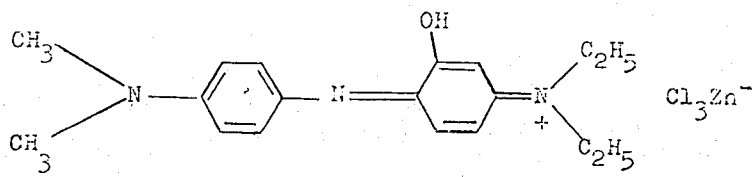

0.02 mole (3 g) of paranitroso dimethylaniline and 0.02 mole (3.3 g) of metadiethylaminophenol are dissolved in 20 cc of absolute ethanol. To this solution are added 3.3 g of zinc chloride and the reaction mixture is heated for 30 minutes at reflux. After cooling, 4.75 g of the double zinc and indamine salt precipitate and are filtered, washed with ethanol and dried under vacuum. This product is chromatographically pure.

EXAMPLE 4

The double chloride of zinc and N-[4-(ethyl, β-acetylaminoethyl)amino phenyl] 3-hydroxy benzoquinoneimine N',N'-diethyliminium, having the below formula, is prepared as follows:

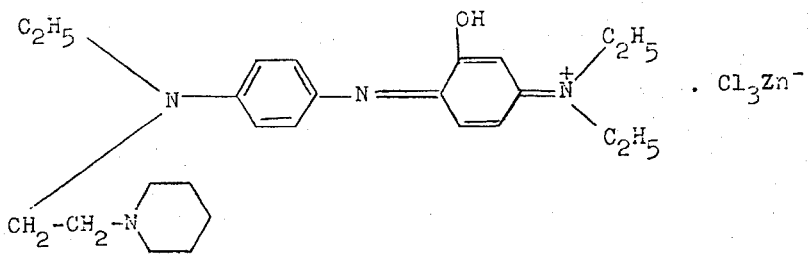

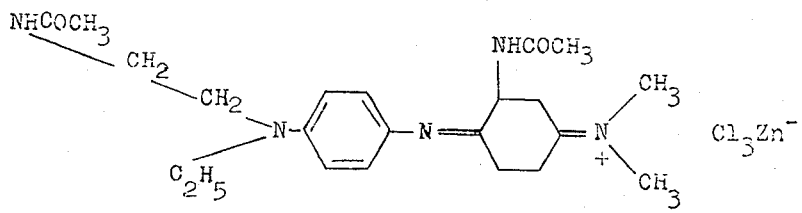

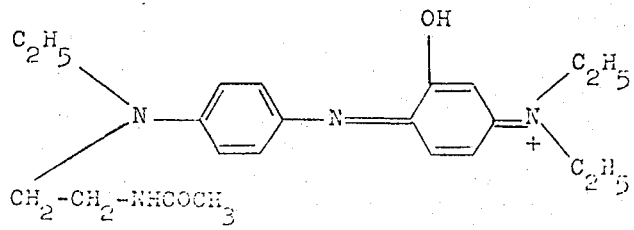

0.02 mole (4.7 g) of paranitroso N,N-(ethyl, β-acetylaminoethyl) aniline and 0.02 mole (3.3 g) of metadiethylamino phenol are dissolved in 30 cc of absolute ethanol. To this solution are added 3 g of zinc chloride and the reaction mixture is heated for 30 minutes at reflux. After cooling, 8.4 g of the above double zinc and indamine chloride are filtered from the reaction mixture, washed with ethanol and dried. This product is chromatographically pure.

EXAMPLE 5

The monohydrate of the chloride of N-[(4-dimethylamino)phenyl] 3-acetylamino benzoquinoneimine N',N'dimethyliminium having the below formula is prepared as follows:

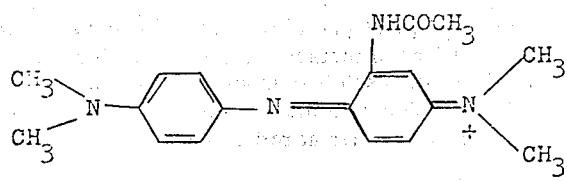 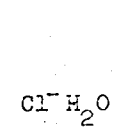

0.2 mole (37.3 g) of paranitroso N,N-dimethylaniline hydrochloride is dissolved in 380 cc of water at 50°. To this solution is rapidly added, with stirring, 0.2 mole (35.6 g) of meta N,N-dimethylaminoacetanilide in 400 cc of water at 50°. The reaction mixture is kept at 50° for two hours. 20 g of sodium chloride are then added. After cooling at 5° for four hours, 53 g of the above iminium chloride, crystallized in monohydrate form, are filtered from the reaction mixture, washed with a little water and then with acetone. This product is chromatographically pure.

| Analysis | Calculated for $C_{18}H_{23}N_4OCl \cdot H_2O$ | Found | |
|---|---|---|---|
| C% | 59.25 | 59.00 | 58.92 |
| H% | 6.85 | 6.75 | 6.78 |
| N% | 15.30 | 15.10 | 15.07 |

EXAMPLE 6

The perchlorate of N-[(4-dimethylamino)phenyl] 3-amino benzoquinoneimine N',N'-dimethyliminium having the below formula is prepared as follows:

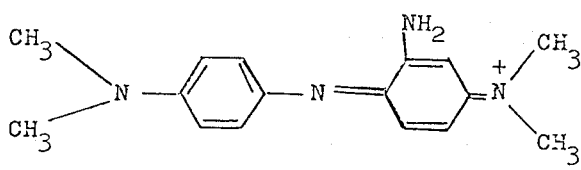 

0.01 mole (2.09 g) of N,N-dimethylparaphenylenediamine dihydrochloride and 0.05 mole (1 g) of N,N-dimethylmetaphenylenediamine dihydrochloride are dissolved in 20 cc of water to which have been added 5 cc of ammonia at 22°Be. 20 cc of 20 volume hydrogen peroxide are immediately added to the mixture. It takes on an intense blue coloring. After 10 minutes at ambient temperature, 10 g of sodium perchlorate are introduced little by little with stirring. The above indamine perchlorate precipitates in the form of garnet crystals whose chromatogram shows, as an impurity, traces of N,N-dimethylparaphenylenediamine. After washing with ethyl acetate, the above indamine perchlorate is chromatographically pure.

| Analysis | Calculated for $C_{16}H_{21}N_4O_4Cl$ | Found | |
|---|---|---|---|
| C% | 52.10 | 52.21 | 51.97 |
| H% | 5.69 | 5.74 | 5.72 |
| N% | 15.19 | 15.24 | 15.16 |

EXAMPLE 7

The persulfate of N-[(4-dimethylamino)phenyl] 3-acetylamino benzoquinoneimine N',N'-dimethyliminium is prepared as follows:

0.05 mole (1.05 g) of N,N-dimethylparaphenylenediamine dihydrochloride is dissolved in 10 cc of water to which have been added 0.8 cc of ammonia. 0.05 mole (0.89 g) of dimethylaminometaacetanilide is dissolved in 5 cc of water to which have been added 5 cc of acetone. The two solutions are mixed and cooled to 0°. There is then added, with stirring, 0.05 mole (1.19 g) of ammonium persulfate in 10 cc of water. After 10 minutes, there is filtered therefrom in the form of green crystals with golden glints, the above indamine persulfate, which, after washing with a little ice water, is chromatographically pure.

EXAMPLE 8

The following hair-setting lotion composition is prepared:

| | |
|---|---|
| Dye of Example 1 | 0.15 g |
| Crotonic acid-vinyl acetate copolymer (90% vinyl acetate, 10% crotonic acid — molecular weight 45,000 to 50,000) | 2 g |
| Ethanol — 96°titer, q.s.p. 50° | |
| Water, q.s.p. | 100 g |
| Triethanolamaine, q.s.p. pH 7 | |

This hair-setting lotion when applied to bleached hair imparts thereto a forget-me-not blue shade with pearly glints.

EXAMPLE 9

The following hair-setting lotion composition is prepared:

| | |
|---|---|
| Dye of Example 3 | 0.1 g |
| Crotonic acid-vinyl acetate (90% vinyl acetate, 10% crotonic acid —molecular weight 45,000 to 50,000) | 2 g |
| Ethanol — 96° titer, q.s.p. 50° | |
| Water, q.s.p. | 100 g |
| Triethanolamine, q.s.p. pH 7 | |

This hair-setting lotion when applied to bleached hair imparts thereto a very luminous intense turquoise blue shade.

EXAMPLE 10

The following dye composition is prepared:

| | |
|---|---|
| Dye of Example 1 | 0.002 g |
| Water, q.s.p. | 100 g |
| Ammonia at 22°Be q.s.p. pH 10 | |

This composition when applied to bleached hair for ten minutes imparts thereto, after rinsing and shampooing, a silvery blue shade.

EXAMPLE 11

The following hair-setting lotion composition is prepared:

| | |
|---|---|
| Dye of Example 4 | 0.1 g |
| Crotonic acid-vinyl acetate copolymer (90% vinyl acetate, 10% crotonic acid — molecular weight 45,000 to 50,000) | 2 g |
| Isopropyl alcohol | 50 g |
| Water, q.s.p. | 100 g |
| Triethanolamaine, q.s.p. pH 7 | |

This hair-setting lotion when applied to bleached hair imparts thereto a very pearly light blue shade.

EXAMPLE 12

The following dye composition is prepared:

| | |
|---|---|
| Dye of Example 5 | 0.2 g |
| Water, q.s.p. | 100 g |
| The pH of the solution is equal to 6.5. | |

This dye composition when applied to 95% naturally white hair for 10 minutes imparts thereto, after rinsing and shampooing, a very intense green shade.

EXAMPLE 13

The following dye composition is prepared:

| | |
|---|---|
| Dye of Example 3 | 0.2 g |
| Ethanol — 96° titer | 25 g |
| Water, q.s.p. | 100 g |
| 10% lactic acid solution, q.s.p. pH 3.3 | |

This dye composition when applied to 95 percent naturally white hair for 20 minutes imparts thereto, after rinsing and shampooing, a light emerald green shade.

EXAMPLE 14

The following hair-setting lotion is prepared:

| | |
|---|---|
| Dye of Example 2 | 0.15 g |
| Crotonic acid-vinyl acetate copolymer (90% vinyl acetate, 10% crotonic acid — molecular weight 45,000 to 50,000) | 2 g |
| Ethanol — 96° titer, q.s.p. 50° | |
| Water, q.s.p. | 100 g |
| Triethanolamine, q.s.p. pH 7 | |

This hair-setting lotion when applied to bleached hair imparts thereto a light green shade with golden glints.

EXAMPLE 15

The following dye composition is prepared:

| | |
|---|---|
| Dye of Example 1 | 0.05 g |
| N-[(2',4'-diamine, 5'methoxy) phenyl] benzoquinoneimine | 0.05 g |
| Ethanol — | 25 g |
| Water, q.s.p. | 100 g |
| Ammonia at 22°Be, q.s.p. pH 10 | |

This dye composition when applied for 10 minutes to 95 percent naturally white hair imparts thereto, after rinsing and shampooing, a deep violet beige shade.

EXAMPLE 16

The following dye composition is prepared:

| | |
|---|---|
| Dye of Example 3 | 0.25 g |
| Nitroparaphenylenediamine | 0.5 g |
| Isopropanol — | 25 g |
| Water, q.s.p. | 100 g |
| Ammonia at 22°Be, q.s.p. pH 10.5 | |

This dye composition when applied for 10 minutes to 95 percent naturally white hair imparts thereto, after rinsing and shampooing, an intense yellow green shade.

EXAMPLE 17

The following hair-setting lotion composition is prepared:

| | |
|---|---|
| Dye of Example 5 | 0.2 g |
| Crotonic acid-vinyl acetate copolymer (90% vinyl acetate, 10% crotonic acid — molecular weight 45,000 to 50,000) | 2 g |
| Ethanol 96° titer, q.s.p. 50° | |
| Triethanolamine, q.s.p. pH 7 | |
| Water, q.s.p. | 100 g |

This hair-setting lotion when applied to light brown hair, imparts thereto a deep brown shade with green glints.

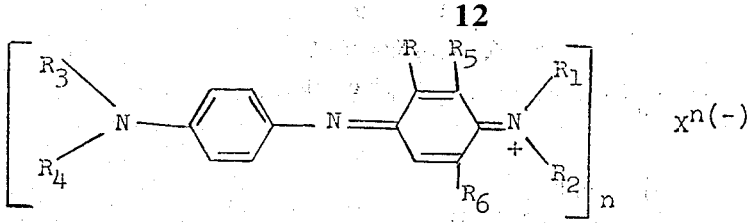

EXAMPLE 18

The following dye composition is prepared:

| | |
|---|---|
| Dye of Example 4 | 0.3 g |
| Butylglycol | 5 g |
| Lauryl alcohol oxyethylenated with 10.5 moles of ethylene oxide | 5 g |
| Water, q.s.p. | 100 g |

This dye composition when applied to 60 percent naturally white hair for 20 minutes imparts thereto, after rinsing and shampooing, a gray green shade.

EXAMPLE 19

The following dye composition is prepared:

| | |
|---|---|
| Dye of Example 6 | 0.05 g |
| Ethanol —96° titer | 25 g |
| Water, q.s.p. | 100 g |

This dye composition which has a pH of 8, is applied to 95 percent naturally white hair for a period of about minutes. After rinsing and shampooing, a silvery green blue shade is obtained.

EXAMPLE 20

The following hair-setting lotion composition is prepared:

| | |
|---|---|
| Dye of Example 7 | 0.1 g |
| Crotonic acid-vinyl acetate copolymer (90% vinyl acetate, 10% crotonic acid —molecular weight 45,000 to 50,000) | 2 g |
| Ethanol — 96° titer, q.s.p. 50° | |
| Water, q.s.p. | 100 g |
| Triethanolamine, q.s.p. pH 7 | |

This hair-setting lotion when applied to bleached hair imparts thereto a light jade green shade.

What is claimed is:

1. An indamine salt including tautomers thereof, having the formula:

wherein $R_1$ and $R_2$ each independently represent lower alkyl; $R_3$ and $R_4$ each independently represent a member selected from the group consisting of lower alkyl and lower alkyl substituted with a member selected from the group consisting of piperidino, hydroxy and acetylamino; $R_5$ and $R_6$ each represent hydrogen; R represents a member selected from the group consisting of amino, acetylamino and hydroxy; n is an integer of 1 or 2; and $X^{n(-)}$ represents an anion selected from the group consisting of persulfate, perchlorate, chloride, bromide and $Cl_3Zn^-$.

2. The indamine of claim 1 selected from the group consisting of the double chloride of zinc and N-[4-(ethyl, β-piperidinoethyl)amino phenyl] 3-hydroxy benzoquinoneimine N', N'-diethyliminium, the double chloride of zinc and N-[4-(ethyl,β-acetylaminoethyl)amino phenyl]3-acetylaminobenzoquinoneimine N',N'-dimethyliminium, the double chloride of zinc and N-[(4-dimethylamino)phenyl] 3-hydroxybenzoquinoneimine N',N'-diethyliminium, the double chloride of zinc and N-[4-(ethyl, β-acetylaminoethyl)amino phenyl] 3-hydroxybenzoquinoneimine N',N'-diethyliminium, the chloride of N-[(4-dimethylamino)phenyl] 3-acetylamino benzoquinoneimine N',N'-dimethyliminium, the perchlorate of N-[(4-dimethylamino)phenyl] 3-amino benzoquinoneimine N',N'-dimethyliminium, and the persulfate of N-[(4-dimethylamino)phenyl] 3-acetylamino benzoquinoneimine N',N'-dimethyliminium.

* * * * *